9/17/85 OR 4,541,690

United States Patent [19]

Clerc

[11] Patent Number: 4,541,690

[45] Date of Patent: Sep. 17, 1985

[54] MATRIX DISPLAY CONTROL PROCESS

[75] Inventor: Jean F. Clerc, Meylau, France

[73] Assignee: Commissariat a l'Energie Atomique, Paris, France

[21] Appl. No.: 524,232

[22] Filed: Aug. 18, 1983

[30] Foreign Application Priority Data

Aug. 26, 1982 [FR] France ................................ 82 14644

[51] Int. Cl.[4] ................................ G02F 1/13

[52] U.S. Cl. ................................ 350/333

[58] Field of Search ................................ 350/333, 335

[56] References Cited

U.S. PATENT DOCUMENTS

| | | | |
|---|---|---|---|
| 4,281,324 | 7/1981 | Nonomura | 350/333 X |
| 4,308,534 | 12/1981 | Yamamoto | 350/333 X |
| 4,359,729 | 11/1982 | Nonomura et al. | 350/333 X |
| 4,375,317 | 3/1983 | Funada et al. | 350/333 X |
| 4,443,062 | 4/1984 | Togashi et al. | 350/333 X |

FOREIGN PATENT DOCUMENTS 2443699 7/1980 France .

*Primary Examiner*—John K. Corbin
*Assistant Examiner*—Richard F. Gallivan

[57] ABSTRACT

Control process for a matrix display comprising a material, whereof an optical property is to be modified, said material being placed between a first group of p parallel electrode rows and a second group of q parallel electrode columns, the rows and columns crossing one another, an area ij of the material being defined by the region of the material covered by row i, in which i is an integer such that $1 \leqq i \leqq p$, and by the column j, in which j is an integer such that $1 \leqq j \leqq q$, the rows and columns being used for carrying signals bringing about an excitation of the material, wherein the electrode rows have n horizontal gaps defining n+1 identical sets of electrode columns, a signal I is applied to electrode row i, while a zero signal is applied to the other electrode rows, the signal I being sequentially applied to the p electrode rows in accordance with increasing values of i, and wherein a signal J is applied to the electrode columns, said signal J being simultaneously applied to the electrode columns of the first set, during the application time of signal I to the p/n first electrode rows, the electrode columns of the other sets receiving a zero signal, then the electrode columns of the second set during the application time of signal I to the p/n following electrode rows, the electrode columns of the first set and other sets receiving a zero signal and so on up to the excitation of the electrode columns of the nth set.

4 Claims, 3 Drawing Figures

MATRIX DISPLAY CONTROL PROCESS

BACKGROUND OF THE INVENTION

The present invention relates to a matrix display control process. It is more particularly used in the construction of liquid crystal display devices, used more especially in the binary display of complex images or alphanumeric characters.

These matrix display devices are generally constituted by a material formed from several areas distributed in matrix-like manner and intercalated into a crossbar system. Such systems comprise a first group of p rows of parallel electrodes and a second group of q columns of parallel electrodes, the electrode rows and columns crossing one another, an area ij of the material being defined by the overlap region between row i, in which i is an integer such that $1 \leqq i \leqq p$ and by the column j, in which j is an integer such that $1 \leqq j \leqq q$. These systems also comprise means making it possible to supply appropriate excitation signals on the electrode rows and columns and which are used for exciting an optical property of the material.

Numerous devices of this type are known, which e.g. use as the sensitive material, a liquid crystal film and in which the excitation is of an electrical nature. The invention is more particularly applicable to such devices, but more generally applies to any device incorporating a material, whereof an optical property can be modified with the aid of a random excitation. This excitation can be of an electrical nature, such as for liquid, crystals, but can also be of a magnetic, thermal, electronic, or similar type. The material can be an amorphous or crystalline liquid or solid body. The optical property can be an opacity, a refractive index, a transparency, an absorption, a diffusion, a diffraction, a convergence, a rotary power, a birefringence, a reflected intensity in a given solid angle, etc.

The most commonly used liquid crystal matrix display control process consists, e.g., of sequentially or successively applying an electrode rows, sinusoidal electrical signal $S_o$ and applying in parallel or simultaneously on electrode columns and during the addressing of a row, sinusoidal electrical $S_j$, which can either be in phase opposition, or in phase with the signal $S_o$, depending on whether or not it is wished to display the corresponding liquid crystal area.

FIG. 1 shows an example of signals applied to the electrode rows and to the electrode columns of a matrix display or imager. The first signal a, corresponds to the signal applied in row i, the second signal b corresponds to the signal applied on column j and the third signal c corresponds to the signal or voltage, seen by area ij of the display material. Time T corresponds to the time during which row i and column j are addressed and time t to the time containing the information necessary for the display or non-display of material area ij. For a sequential addressing of the p rows, time T corresponds to the addressing time of all the rows and is governed by equation $T = pt$.

This control process, which is easy to perform, can only be used for a limited number of rows (p close to 100), which limits its use. Thus, in certain applications such as in pocket televisions, text display screens, etc., the number of rows required is very large to enable the use of said control process. The use of this process leads to an inadequate contrast between the displayed points and the undisplayed points, so that a blurred image is obtained. This is linked with the reaction time of the display material during its excitation and/or to its memory effect.

For these applications, it is necessary to use electrode structures and control signals making it possible to retain the number of display points or display areas which are desired on the display or imager and divide by two the number of sequentially addressed electrode rows.

One of the solutions consists of using electrode columns with a special geometry permitting the parallel control thereof, as well as the simultaneous control of the electrode row i and the electrode row i+1. This solution developed by Itachi was decribed at the conference of the "Society for Information Display" in 1980. This solution is compatible with taking information on a video signal, with storage with respect to the row. Unfortunately, the structure of the electrode columns is complex and their realisation difficult.

SUMMARY OF THE INVENTION

The present invention relates to a control process for a matrix display, which makes it possible to obviate this disadvantge.

More specifically, the present invention relates to a control process for a matrix display comprising a material, whereof an optical property is to be modified, said material being placed between a first group of p parallel electrode rows and a second group of q parallel electrode columns, the rows and columns crossing one another, an area ij of the material being defined by the region of the material covered by row i, in which i is an integer such that $1 \leqq i \leqq p$, and by the column j, in which j is an integer such that $1 \leqq j \leqq q$, the rows and columns being used for carrying signals bringing about an excitation of the material, wherein the electrode columns have n horizontal gaps defining n+1 identical sets of electrode columns, a signal I is applied to electrode row i, whilst a zero signal is applied to the other electrode rows, the signal I being sequentially applied to the p electrode rows in accordance with increasing values of i, and wherein a signal J is applied to the electrode columns, said signal J being simultaneously applied to the electrode columns of the first set, during the application time of signal I to the first $p/(n+1)$ electrode rows, the electrode columns of the other sets receiving a zero signal, then the electrode columns of the second set during the application time of signal I to the following $p/(n+1)$ electrode rows, the electrode columns of the first set and other sets receiving a zero signal and so on up to the excitation of the electrode columns of the nth set.

The fact of sequentially controlling the electrode rows in accordance with increasing values of i is compatible with information taking on a video signal. Moreover, the use of electrode columns having horizontal gaps makes it possible to separately control the different sets of electrode columns formed, and consequently increase the multiplexing level of the display, i.e. its number of electrode rows. Moreover, the electrode columns have a very simple structure.

According to a preferred embodiment of the invention, signals I and J are square-wave signals with a zero mean value. Moreover, these signals I and J can either be in phase, or in phase opposition.

According to another preferred embodiment of the invention, the material whereof an optical property is to be modified is a liquid crystal film, the excitation signals applied to the electrodes being electrical voltages.

Other features and advantages of the invention can be better gathered from the following description, given in a non-limitative, illustrative manner. For reasons of clarity, the description refers to a liquid crystal matrix display device, whose optical property varies as a function of the electrical field applied thereto. However, as was stated hereinbefore, the invention has a much more general application, but said display device is at present well known and widely used, so that it is preferable to provide a description relative thereto.

BRIEF DESCRIPTION OF THE DRAWINGS

The following description relates to the attached drawings, wherein show.

DETAILED DESCRIPTION OF THE INVENTION

Figure 2:
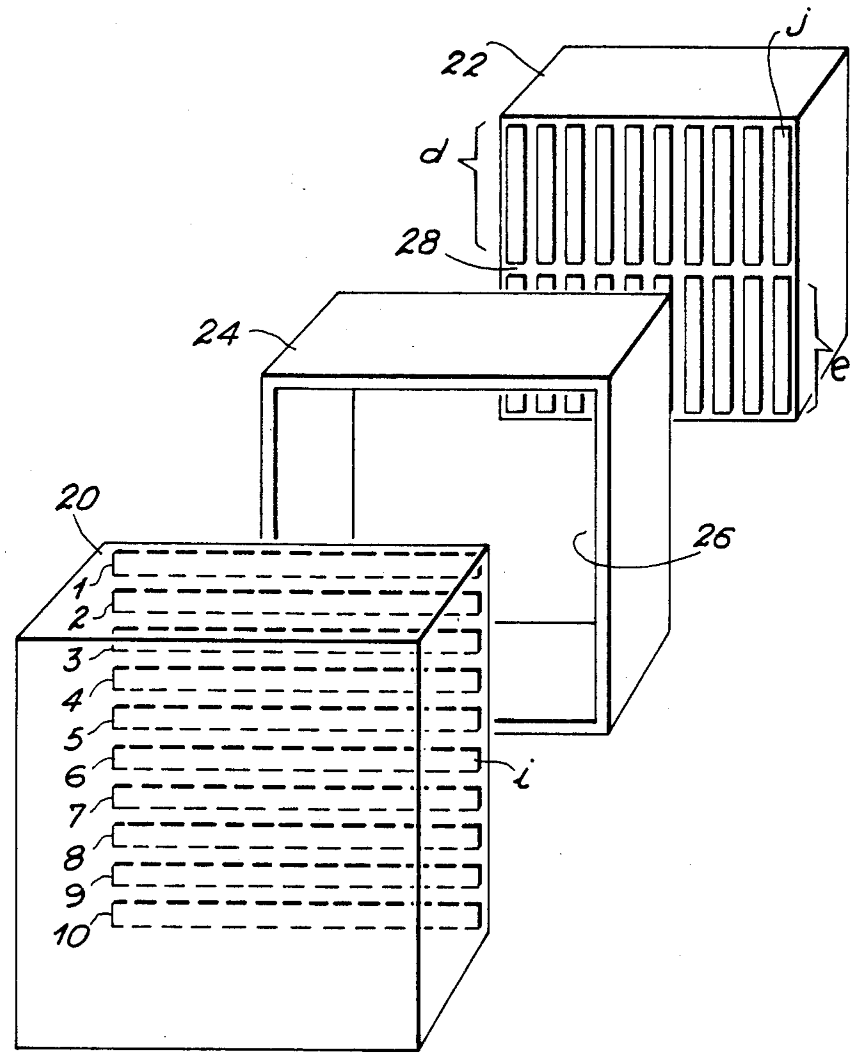
FIG. 2 an exploded perspective view of a liquid crystal display using cross-bar electrodes according to the invention.

FIG. 2 shows a cross-bar display device having walls 20, 22, which are generally transparent, arranged on either side of an insulating material shin 24 defining a volume 26 which is occupied, when the device is fitted, by the material, whereof an optical feature is controlled, such as e.g. a liquid crystal film. On walls 20, 22 are deposited two systems of electrodes, constituted in each case by a series of semitransparent, parallel, conductive strips, designated i for the rows and j for the columns. The useful surface of the liqui crystal is consequently broken down into a mosaic of zones corresponding to the overlap areas of the two systems of electrodes, each of which corresponds to the overlap of two strips i and j and which can therefore be designated ij.

The sensitization of an area ij, i.e. the control of an optical characteristic of the liquid crystal contained therein, takes place by applying to the electrodes i and j electrical voltages, which bring about the appearance of an electrical field within the liquid crystal. Thus, an image appears on the complete device, whereby it is defined point-by-point and by successively sensitizing the areas in accordance with the known sequential control principles.

According to the invention, the column electrodes j have n horizontal gaps 28 defining n+1 identical sets of q electrode columns, q being the total number of the electrode columns. FIG. 2 shows only a single gap 28 defining two sets of electrode columns, an upper set d and a lower set e.

Figure 1:
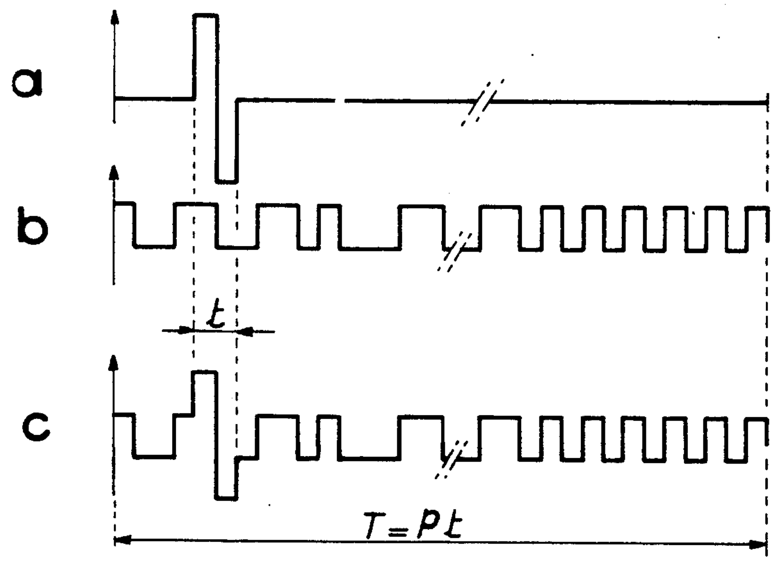
FIG. 1 already described, the shape of the signals applied to the electrodes of a prior art cross-bar matrix display.
Figure 3:
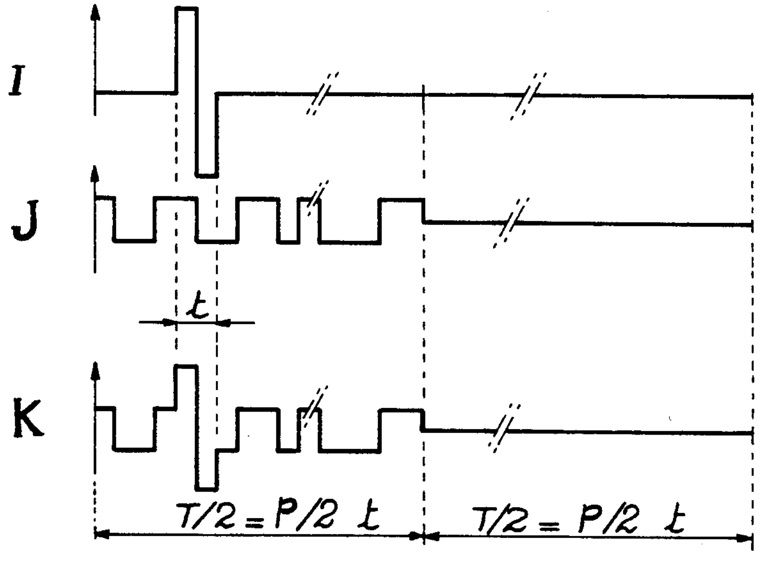
FIG. 3 the shape of the electrodes applied to the signals of the display according to FIG. 2.

FIG. 3 shows the shape of the signals applied to the electrode row i and to the electrode column j, for sensitizing display material area ij, said signals being those used for n=1.

According to the invention, using known means, a signal I is applied to electrode row i, whilst a zero signal is applied to the other electrode rows. This signal I is preferably a square-wave signal with a zero mean value, in the manner shown in FIG. 3. The excitation of all the rows i takes place sequentially and in accordance with increasing values of i. In other words, the signal I is applied to the first row, then to the second row and then to the third row, etc, up to the pth row, p being the total number of rows. This is compatible with information taking on a visible signal.

In the same way, signal J is applied to the electrode column j. For example, this signal can be a square-wave signal with a zero mean value, as shown in FIG. 3. According to the invention, signal J is simultaneously applied to the electrode columns of the first set during the addressing time, or the application time of signal I, of the first p/(n+1) electrode rows, the electrode columns of the other set receiving a zero signal.

This signal J is then simultaneously applied to the electrode columns of the second set during the addressing time, or the application time of signal I, of the following p/(n+1) electrode rows, the electrode columns of all the other sets, including the first set, receiving a zero signal. The appearance of an image on the complete device is obtained by exciting the electrode columns of all the sets, as hereinbefore, which takes place in a successive manner until the electrode columns of the nth set has been excited. The excitation of n+1 sets of electrode columns takes place by using known means associated with each set of electrode columns.

When n is equal to 1 and p is equal to 10, signal J is simultaneously applied to the columns of set d (FIG. 2) during the sequential addressing of the rows 1, 2, 3, 4 and 5, respectively, the columns of the set e receiving a zero signal. Then signal J is simultaneously applied to the columns of set e, during the sequential addressing of the rows 6, 7, 8, 9 and 10 respectively, the columns of set e receiving a zero signal.

In FIG. 3, time T corresponds to the addressing time of all the rows i sequentially, and time T corresponds to the time containing the information, i.e. leading to the display or non-display of material area ij. Time T is governed by the equation T=pt, p being the total number of rows. The display of area ij then takes place when the signal I and signal J are, during time t, in phase opposition and the non-display of this area takes place when signals I and J are in phase, as shown in the FIG. 3. Moreover, it shows a third signal K corresponding to the signal or voltage, seen by the display material area ij.

It is pointed out that all then of the three signals I, J and K have a zero value at the end of a time T/2. This time corresponds to the addressing time of p/2 electrode rows and one of the two sets of electrode columns.

The fact of using discontinuous electrode columns and of alternately addressing the different sets of electrode columns makes it possible to obtain matrix displays having a large number of electrode rows, whilst obtaining thereon a well contrasted image.

What is claimed is:

1. A control process for a matrix display comprising a material, whereof an optical property is to be modified, said material being placed between a first group of p parallel electrode rows and a second group of q parallel electrode columns, the rows and columns crossing one another, an area ij of the material being defined by the region of the material covered by row i, in which i is an integer such that $1 \leqq i \leqq p$, and by the column j, in which j is an integer such that $1 \leqq j \leqq q$, the rows and columns being used for carrying signals bringing about an excitation of the material, wherein the electrode columns have n horizontal gaps defining n+1 identical sets of electrode columns, a signal I is applied to electrode row i, whilst a zero signal is applied to the other electrode rows, the signal I being sequentially applied to the p electrode rows in accordance with increasing values of i, and wherein a signal J is applied to the electrode columns, said signal J being simultaneously applied to the electrode columns of the first set, during the application time of signal I to the first p/(n+1) electrode rows, the electrode columns of the other sets receiving a zero signal, then the electrode columns of the second set during the application time of signal I to the following p/(n+1) electrode rows, the electrode columns of the first set and other sets receiving a zero signal and so on up to the excitation of the electrode columns of the nth set.

2. A control process according to claim 1, wherein the signals I and J are square-wave signals having a zero mean value.

3. A control process according to claim 1, wherein signals I and J are either in phase, or in phase opposition.

4. A control process according to claim 1, wherein the material is a liquid crystal film, the excitation signals applied to the electrodes being electrical voltages.

* * * * *